United States Patent
Hu et al.

(10) Patent No.: US 11,489,768 B2
(45) Date of Patent: Nov. 1, 2022

(54) METHOD FOR CREATING INTER-DOMAIN BIDIRECTIONAL TUNNEL, COMMUNICATION METHOD AND DEVICE, AND STORAGE MEDIUM

(71) Applicant: ZTE CORPORATION, Guangdong (CN)

(72) Inventors: Fangwei Hu, Guangdong (CN); Quan Xiong, Guangdong (CN); Shuangping Zhan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/278,365

(22) PCT Filed: Sep. 26, 2019

(86) PCT No.: PCT/CN2019/108203
§ 371 (c)(1),
(2) Date: Mar. 22, 2021

(87) PCT Pub. No.: WO2020/063765
PCT Pub. Date: Apr. 2, 2020

(65) Prior Publication Data
US 2021/0352012 A1 Nov. 11, 2021

(30) Foreign Application Priority Data
Sep. 26, 2018 (CN) .......................... 201811123261.7

(51) Int. Cl.
*G06F 15/16* (2006.01)
*H04L 45/50* (2022.01)
(Continued)

(52) U.S. Cl.
CPC .......... *H04L 45/507* (2013.01); *H04L 45/021* (2013.01); *H04L 45/04* (2013.01); *H04L 45/34* (2013.01)

(58) Field of Classification Search
CPC ........ H04L 45/507; H04L 45/04; H04L 45/34
See application file for complete search history.

(56) References Cited

U.S. PATENT DOCUMENTS

| | | | |
|---|---|---|---|
| 9,807,001 B2* | 10/2017 | Previdi | H04L 45/50 |
| 2007/0217406 A1* | 9/2007 | Riedel | H04L 47/29 370/389 |

(Continued)

FOREIGN PATENT DOCUMENTS

| | | |
|---|---|---|
| CN | 1968178 A | 5/2007 |
| CN | 101931583 A | 12/2010 |

(Continued)

OTHER PUBLICATIONS

Li et al., PCEP Extension for Segment Routing (SR) Bi-directional Associated Paths draft-li-pce-sr-bidir-path-00, Jun. 20, 2018 (Year: 2018).*

(Continued)

*Primary Examiner* — Hieu T Hoang
(74) *Attorney, Agent, or Firm* — Li & Cai Intellectual Property (USA) Office (57) ABSTRACT

Provided is a method for creating an inter-domain bidirectional tunnel. The method includes: receiving, by a node, a path creation message sent by a path computation element, the path creation message including mapping path information for creating an inter-domain label switched path (LSP), and bidirectional tunnel instruction information, and obtaining, by the node, an actual transmission path, which is used for data transmission between intra-domain or inter-domain nodes, based on the mapping path information and the bidirectional tunnel instruction information. The present (Continued)

disclosure further provides a communication method, a communication device, and a computer-readable storage medium.

20 Claims, 5 Drawing Sheets

(51) Int. Cl.
*H04L 45/021* (2022.01)
*H04L 45/02* (2022.01)
*H04L 45/00* (2022.01)

(56) References Cited

U.S. PATENT DOCUMENTS

| | | | |
|---|---|---|---|
| 2012/0106507 A1* | 5/2012 | Venkataswami | H04L 45/50 370/331 |
| 2012/0182943 A1* | 7/2012 | Bahr | H04W 40/26 370/328 |
| 2014/0003232 A1 | 1/2014 | Guichard et al. | |
| 2014/0101335 A1 | 4/2014 | Filsfils et al. | |
| 2015/0249593 A1* | 9/2015 | Alvarez | H04L 45/30 370/241 |
| 2017/0317929 A1 | 11/2017 | Chen et al. | |
| 2018/0131570 A1* | 5/2018 | Lee | H04L 41/5051 |
| 2019/0058615 A1* | 2/2019 | Rokui | H04L 41/12 |
| 2019/0068403 A1* | 2/2019 | Lee | H04L 12/4633 |
| 2019/0190818 A1* | 6/2019 | Ceccarelli | H04L 45/52 |
| 2020/0304419 A1* | 9/2020 | Karunanithi | H04L 45/64 |
| 2020/0351197 A1* | 11/2020 | Zhan | H04L 12/4633 |

FOREIGN PATENT DOCUMENTS

| | | |
|---|---|---|
| CN | 102065512 A | 5/2011 |
| CN | 105075201 A | 11/2015 |
| CN | 105634940 A | 6/2016 |
| CN | 107710693 A | 2/2018 |
| EP | 3629530 A1 | 4/2020 |
| EP | 3731473 A1 | 10/2020 |

OTHER PUBLICATIONS

Barth et al. , PCEP Extensions for Associated Bidirectional Label Switched Paths (LSPs) draft-ietf-pce-association-bidir-01, May 18, 2018 (Year: 2018).*
WIPO, International Search Report dated Nov. 27, 2019.
Xihua Fu, et al. "A Dual-end Recursive PCE-Based Computation (DRPC) Procedure to Compute Shortest Constrained Inter-domain Traffic Engineering Label Switched Paths," Internet-Draft of the Internet Engineering Task Force (IETF), Aug. 31, 2011.
Fangwei Hu, et al. "Segment Routing Transport Profile Use Case," Internet-Draft of the Internet Engineering Task Force (IETF), Mar. 4, 2018.
Hongsheng Zhou, et al. "Multi-domain Routing Technology based on PCE for Intelligent Optical Networks," 6th International Conference on Computer Science and Network Technology (ICCSNT), Oct. 22, 2017.
China Patent Office, First Office Action dated Sep. 13, 2021, for corresponding Chinese application No. 201811123261.7.
Sivabalan, et al., "PCEP Extensions for segment routing draft-ietf-pce-segment-routing-12," PCE Internet-Draft dated Jun. 29, 2018.
Saad, et al., "A YANG Data Model for Traffic Engineering Tunnels and Interfaces draft-ietf-teas-yang-te-15", TEAS Working Group, Internet-Draft, dated Jun. 12, 2018.
European Patent Office, Extended European search report dated May 9, 2022, for corresponding EP application No. 19866468.2.
Xh, Fu, et al., "A Dual-end Recursive PCE-Based Computation (DRPC) Produce to Compute shortes Constrained Inter-domain Traffic Engineering label switched paths draft-fuxh-pce-drpc-03", Network Working Group, Internet-Draft, Aug. 31, 2011.
Quan Xiong, et al. "PCEP extensions for SR-TP draft-xiong-pce-pcep-extension-sr-tp-07", PCE WG, Internet-Draft, Aug. 28, 2018.
O. Dugeon, et al., "PCEP extensions for Stateful Inter-Domain Tunnels draft-dugeon-pce-stateful-interdomain-01", Path Computation Element Working Group, Internet-Draft, Jul. 2, 2018.

* cited by examiner

METHOD FOR CREATING INTER-DOMAIN BIDIRECTIONAL TUNNEL, COMMUNICATION METHOD AND DEVICE, AND STORAGE MEDIUM

TECHNICAL FIELD

The present disclosure relates to, but is not limited to, the field of network communication technology.

BACKGROUND

Segment Routing (SR), which is a source routing technology, guides forwarding of a packet by pushing a string of ordered labels (segments) on a source node, and can conveniently realize, with an SR-specified path forwarding function, load balancing and traffic engineering of a network and complex network functions such as fast reroute protection irrelevant to topology.

SR supports forwarding on Multiprotocol Label Switching (MPLS) data plane and forwarding on Internet Protocol Version 6 (IPv6) data plane, and is completely compatible with and inherits the MPLS forwarding/data plane in MPLS scenarios, and SR forwarding can be implemented with no need to modify an MPLS packet header. Compared with conventional MPLS solutions, SR has the advantages that an SR control plane is more simplified and totally based on distributed routing protocols, and can achieve segment distribution through simple extension of Interior Gateway Protocol (IGP).

Segments represent the information of network topology (nodes or links), and end-to-end connection is represented by a group of ordered label stacks. For realizing the extension of an MPLS network, the nodes only need to maintain topology information, but do not need to maintain states of connection. Based on existing operations, an end-to-end path can be created through operations on a head node alone, which greatly increases efficiency of service deployment.

In order to implement the traffic engineering of an SR network, it is often necessary to deploy a centralized controller or a path computation element (PCE) to perform constrained path computation according to bandwidth, cost, label resources, and the like of the entire network, so as to achieve global optimization of traffic.

PCE Communication Protocol (PCEP) is a path computation protocol widely applied to networks, and can also be used as a southbound interface protocol of an SR controller. In order to support SR tunnels, the Internet Engineering Task Force (IETF) extends the PCEP in draft-ietf-pce-segment-routing. It is defined in the draft that a Path Computation Client (PCC) and a PCE perform capability negotiation on the PCC and PCE through Open message during the initialization of a PCEP session. If the negotiation is successful, an SR tunnel can be created through the PCEP, so as to support deployment requirements of SR in controller scenarios.

Figure 1:
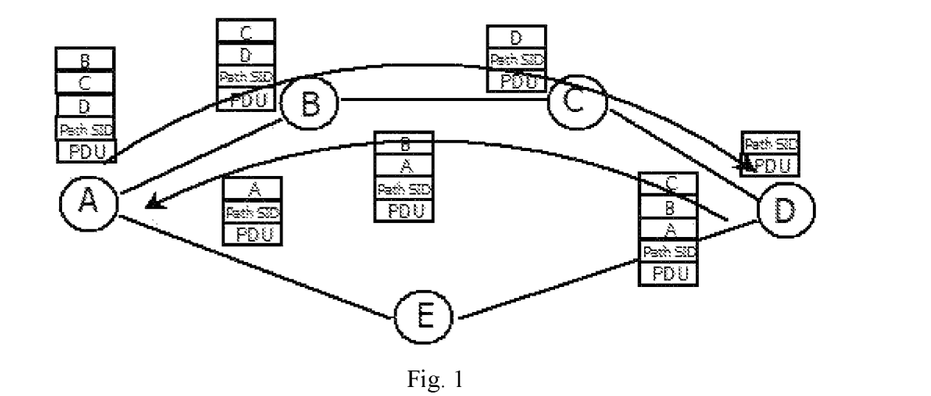
FIG. 1 is a bidirectional SR tunnel model.

The SR technology can be applied to IPRAN (IP Radio Access Network), MPLS-TP, metropolitan area network, data center interconnection, etc. In the case of being applied to an MPLS-TP network, the SR technology needs to be extended to support the creation of a bidirectional tunnel. A bidirectional tunnel can be created by associating unidirectional tunnels in the conventional MPLS technology. For an SR tunnel, the states of connection are maintained only on the head node, and the tail node does not carry any connection information, which makes it impossible to associate and bind two unidirectional tunnels at both ends of the tunnels, resulting in the limitation of the application of SR. As shown in FIG. 1, the IETF provides an extension to SR for applications of transport networks in draft-cheng-spring-mpls-path-segment-00, and defines a Segment Routing Transport Profile (SR-TP) tunnel for the transport networks. A Path SID is introduced to identify an SR Path, and bidirectional binding is realized. Serving as an SR Path identifier, the Path SID is located after a last SR Segment, and the nodes at both ends of an SR Path need to maintain a mapping relationship between SR path information and the Path SID, so as to realize the binding of a bidirectional tunnel.

SUMMARY

The embodiments of the present disclosure provide a method for creating an inter-domain bidirectional tunnel, a communication method, a communication device, and a computer-readable storage medium.

The embodiments of the present disclosure provide a method for creating an inter-domain bidirectional tunnel, including: receiving, by a domain-boundary node, a path creation message which is sent by a PCE or a hierarchical path element and includes mapping path information for creating an inter-domain label switched path (LSP) and bidirectional tunnel instruction information; and obtaining an actual transmission path, which is used for data transmission between intra-domain or inter-domain nodes, based on the mapping path information and the bidirectional tunnel instruction information.

The embodiments of the present disclosure further provide a communication method for an inter-domain bidirectional tunnel, including: receiving, by a domain-boundary node, a path creation message which is sent by a PCE or a hierarchical path element and includes mapping path information for creating an inter-domain LSP and bidirectional tunnel instruction information; obtaining an actual transmission path based on the mapping path information and the bidirectional tunnel instruction information; and sending to-be-transmitted data by the domain-boundary node to a next node based on the actual transmission path.

The embodiments of the present disclosure further provide a device for creating an inter-domain bidirectional tunnel, including a receiving module configured to receive a path creation message which is sent by a PCE or a hierarchical path element and includes mapping path information for creating an inter-domain LSP and bidirectional tunnel instruction information; and a path creating module configured to obtain an actual transmission path, which is used for data transmission between intra-domain or inter-domain nodes, based on the mapping path information and the bidirectional tunnel instruction information.

The embodiments of the present disclosure further provide a communication device for an inter-domain bidirectional tunnel, including the above device for creating an inter-domain bidirectional tunnel, and a data transmission unit; the device for creating an inter-domain bidirectional tunnel is configured to receive a path creation message sent by a PCE or a hierarchical path element, where the path creation message includes the mapping path information for creating an inter-domain LSP and the bidirectional tunnel instruction information, and obtain an actual transmission path based on the mapping path information and the bidirectional tunnel instruction information; and the data transmission unit is configured to transmit to-be-transmitted data from a current node to a next node based on the actual transmission path.

The embodiments of the present disclosure further provide a communication device, including a processor, a memory, and a communication bus; the communication bus is configured to implement communication connection between the processor and the memory; the processor is configured to execute one or more first programs stored in the memory to perform the steps of the above method for creating an inter-domain bidirectional tunnel; or the processor is configured to execute one or more second programs stored in the memory to perform the steps of the above communication method for an inter-domain bidirectional tunnel.

The embodiments of the present disclosure further provide a computer-readable storage medium having one or more first computer programs and second computer programs stored therein; the one or more first computer programs are executable by one or more processors to implement the steps of the above method for creating an inter-domain bidirectional tunnel; and the one or more second computer programs are executable by one or more processors to implement the steps of the above communication method for an inter-domain bidirectional tunnel.

DETAILED DESCRIPTION

In order to make the objectives, technical solutions and advantages of the present disclosure clearer, the embodiments of the present disclosure are further described in detail below in conjunction with the specific implementations and accompanying drawings. It should be understood that the specific embodiments described herein are merely intended to explain the present disclosure, rather than limiting the present disclosure.

Embodiment One

At present, the traffic engineering of an SR network is implemented by deploying a centralized controller or a PCE, and PCEP is a path computation protocol widely applied to networks, and can also be used as a southbound interface protocol of an SR controller. In order to support SR tunnels, the IETF provides an extension to SR for applications of transport networks in draft-cheng-spring-mpls-path-segment-00, and defines a SR-TP tunnel for the transport networks. A Path SID is introduced to identify an SR Path, and bidirectional binding is realized, but the definitions given in the draft can be applied only under single-domain circumstances, and inter-domain circumstances are not considered in the draft. When the above method is used for an inter-domain situation, a label stack of a path is very long, which makes it hard for the apparatus to parse and encapsulate.

An embodiment of the present disclosure proposes a segmented path segment to solve the above problem, and the path segment is configured to indicate a path identifier of a domain where the path segment is located; the segmented path segment is mapped onto a next path segment or a forwarding path from path segment to next domain at a domain boundary; the mapping between the path segment and the next path segment or between the path segment and the forwarding path from path segment to next domain is realized by extending an association type, which includes bidirectional label switched path (LSP) association and stitching LSP association, the bidirectional LSP association is used for bidirectional-tunnel path binding on a head node and a tail node, and the stitching LSP association is used for LSP splicing between inter-domain boundary nodes; and the stitching LSP association is expressed in an association type-length-value (TLV) format, which includes association type, association id, etc.

Figure 2:
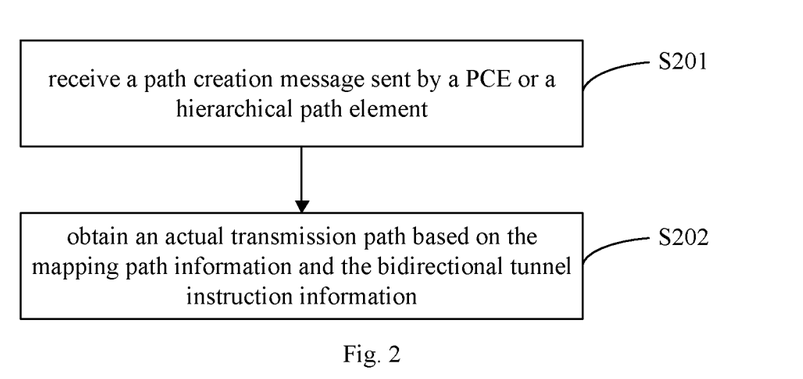
FIG. 2 is a flowchart illustrating a method for creating an inter-domain bidirectional tunnel according to an embodiment of the present disclosure.

FIG. 2 is a flowchart illustrating a method for creating an inter-domain bidirectional tunnel according to an embodiment of the present disclosure. The creation method includes steps S201 and S202.

At the step S201, receiving a path creation message sent by a PCE or a hierarchical path element.

At this step, the path creation message is sent mainly in the form of an inter-domain path creation PCInitiate message. The description below is given by taking sending PCInitiate messages as an example. In addition to the PCInitiate message, the path creation message can be other messages, as long as those messages are supported by node communication or links.

The PCInitiate message is a message for creating an inter-domain path, and includes mapping path information for creating an inter-domain LSP, and bidirectional tunnel instruction information, the mapping path information for the inter-domain LSP includes path segment information, and the bidirectional tunnel instruction information includes an association type of the path segment information, and the association type is configured to identify whether the path segment information is inter-domain bidirectional path segment information or intra-domain bidirectional path information.

The path segment information includes intra-domain path segment information, or intra-domain path segment information and inter-domain path segment information.

The association type includes bidirectional LSP association used for bidirectional-tunnel path binding on a head node and a tail node, and stitching LSP association used for LSP splicing between inter-domain boundary nodes.

At the step S202, obtaining an actual transmission path based on the mapping path information and the bidirectional tunnel instruction information.

The actual transmission path is used for data transmission between intra-domain or inter-domain nodes.

In this embodiment, a node receives the PCInitiate message through the hierarchical PCEP. In some embodiments, two types of path segment information, namely intra-domain path segment information and inter-domain path segment information, are simultaneously received by a node, the intra-domain path segment information includes intra-domain forward path segment information and intra-domain reverse path segment information, and the inter-domain path segment information includes inter-domain forward path segment information and inter-domain reverse path segment information.

In this embodiment, the node acquires different pieces of path segment information by receiving one or more PCInitiate messages. A total number of the PCInitiate messages received is specified according to a processing rule of the PCE.

For the path segment information received by the node, at least one of the following conditions are met: the path segment information includes intra-domain forward path segment information and intra-domain reverse path segment information, the path segment information includes inter-domain forward path segment information and intra-domain reverse path segment information, and the path segment information includes intra-domain forward path segment information and inter-domain reverse path segment information.

The node processes the received path segment information according to the association type carried in the received PCInitiate message. If a current domain-boundary node is an ingress boundary node or an egress boundary node, the association type is bidirectional LSP association, which indicates that the forward path segment information and the reverse path segment information received by the node belong to intra-domain path segment information. In such case, the path is directly determined according to a preset intra-domain path computation rule. In some embodiments, a corresponding bidirectional-tunnel path segment is calculated according to the bidirectional LSP association and the intra-domain path computation rule, and the actual transmission path is determined based on the bidirectional-tunnel path segment and is bound.

If the current domain-boundary node is an inter-domain boundary node, the association type is stitching LSP association, which indicates that a next communicate node relative to the inter-domain boundary node is a boundary node in another domain, and the path segment information received by the inter-domain boundary node includes intra-domain path segment information and inter-domain path segment information, the intra-domain path segment information is path segment information from the current node to a previous intra-domain node, and the inter-domain path segment information is a forwarding path from the current node to the boundary node in another domain.

The step of obtaining the actual transmission path based on the mapping path information and the bidirectional tunnel instruction information includes splicing the intra-domain path segment information and the forwarding path according to the stitching LSP association to generate an inter-domain bidirectional mapped path and an inter-domain bidirectional-tunnel path segment.

Figure 5:
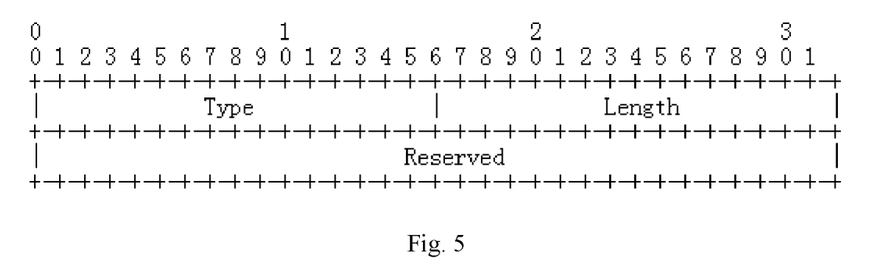
FIG. 5 shows a format of a stitching LSP association type-length-value (TLV) according to an embodiment of the present disclosure.

In practical applications, the information about the stitching LSP association is stored as data in a TLV format in the PCInitiate message and sent along with the PCInitiate message, and the TLV format includes a Type field, a Length field, and a Reserved field. As shown in FIG. 5, a Type field is 16 bits long, and a value indicating that this TLV is a TLV of stitching LSP association is assigned relying on Internet Assigned Numbers Authority (IANA) of the IETF; a value of a Length field is 4, which indicates that this TLV is 4 bytes; and a Reserved field is a field reserved for later extensions.

In this embodiment, the PCE includes a parent PCE and a child PCE, the parent PCE (H-PCE) is configured to perform inter-domain path computation and traffic scheduling, the child PCE is configured to receive inter-domain path segment information sent by the H-PCE, perform path computation and traffic scheduling within a domain where the child PCE is located, and then send the inter-domain path segment information and intra-domain path segment information to a corresponding node. In practical applications, the H-PCE is connected to and exchanges information with PCE1, PCE2, and PCE3 via the hierarchical PCEP.

In some embodiments, the child PCE acquires a first PCInitiate message carrying inter-domain path segment information from the parent PCE through the PCEP; and the child PCE calculates path segment information between the nodes within the domain where the child PCE is located according to an intra-domain node path computation rule, generates a second PCInitiate message, and sends the second PCInitiate message to a corresponding node; or the child PCE encapsulates the calculated path segment information between the nodes within the domain in the first PCInitiate message, and then sends the first PCInitiate message to the corresponding node.

With the creation method of an inter-domain bidirectional tunnel provided by this embodiment, the node receives the PCInitiate message, which includes the mapping path information for creating an inter-domain LSP and the bidirectional tunnel instruction information, from the PCE, and obtains the actual transmission path, which is used for the data transmission between the intra-domain or inter-domain nodes, based on the mapping path information and the bidirectional tunnel instruction information; by sending mapping path information used for configuring segments, the node can obtain the previous path segment and the next path segment from the mapping path information, and subject the two path segments to re-association and encapsulation, thereby creating a bidirectional tunnel; and a label stack of the created path is relatively simple, so that it is easy for the node to search and parse during data transmission, which greatly increases efficiencies of service deployment and data transmission, and also improves user experience.

Embodiment Two

Figure 3:
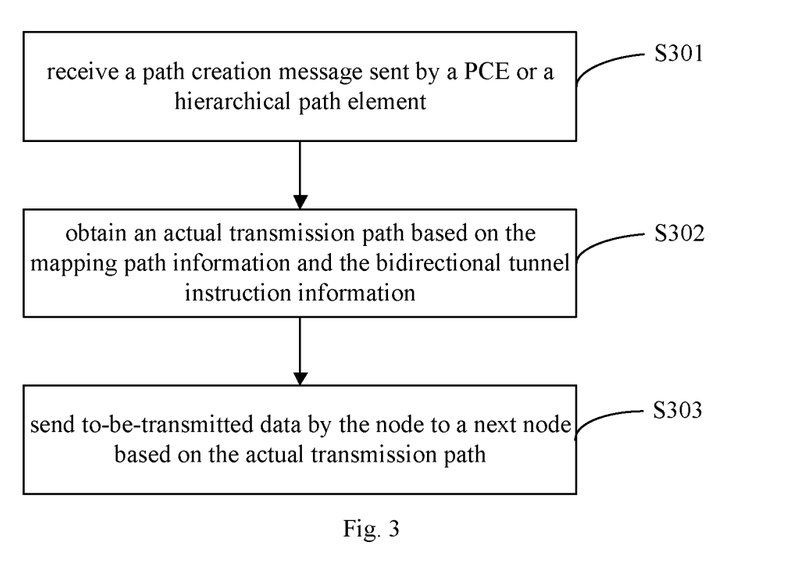
FIG. 3 is a flowchart illustrating a communication method for an inter-domain bidirectional tunnel according to an embodiment of the present disclosure.

FIG. 3 illustrates a communication method of an inter-domain bidirectional tunnel according to an embodiment of the present disclosure. In the communication method, the creation of an inter-domain bidirectional tunnel is implemented with the method provided by the Embodiment One. After a tunnel is created based on the method provided by the Embodiment One, a node can perform inter-domain data transmission through corresponding search or data encapsulation.

In this embodiment, the processing steps of the communication method include steps S301 to S303.

At the step S301, receiving a path creation message sent by a PCE or a hierarchical path element.

At this step, the path creation message is sent mainly in the form of an inter-domain path creation PCInitiate message. The description below is given by taking sending PCInitiate messages as an example. In addition to the PCInitiate message, the path creation message can be other messages, as long as those messages are supported by node communication or links.

The PCInitiate message is a message for creating an inter-domain path, and includes mapping path information for creating an inter-domain LSP, and bidirectional tunnel instruction information, the mapping path information for the inter-domain LSP includes path segment information, and the bidirectional tunnel instruction information includes an association type of the path segment information, and the association type is configured to identify whether the path segment information is inter-domain bidirectional path segment information or intra-domain bidirectional path information.

The path segment information includes intra-domain path segment information, or intra-domain path segment information and inter-domain path segment information.

The association type includes bidirectional LSP association used for bidirectional-tunnel path binding on a head node and a tail node, and stitching LSP association used for LSP splicing between inter-domain boundary nodes.

At the step S302, obtaining an actual transmission path based on the mapping path information and the bidirectional tunnel instruction information.

At the step S303, sending to-be-transmitted data by a node to a next node based on the actual transmission path.

In this embodiment, when the node receives the PCInitiate message, the path segment information in the PCInitiate message is generated through the hierarchical PCEP. In some embodiments, two types of path segment information, namely intra-domain path segment information and inter-domain path segment information, are simultaneously received by a node, the intra-domain path segment information includes intra-domain forward path segment information and intra-domain reverse path segment information, and the inter-domain path segment information includes inter-domain forward path segment information and inter-domain reverse path segment information.

In this embodiment, the node acquires different pieces of path segment information by receiving one or more PCInitiate messages. A total number of the PCInitiate messages received is specified according to a processing rule of the PCE.

For the path segment information received by the node, at least one of the following conditions are met: the path segment information includes intra-domain forward path segment information and intra-domain reverse path segment information, the path segment information includes inter-domain forward path segment information and intra-domain reverse path segment information, and the path segment information includes intra-domain forward path segment information and inter-domain reverse path segment information.

The node processes the received path segment information according to the association type carried in the received PCInitiate message. If the association type includes the bidirectional LSP association, which indicates that the forward path segment information and the reverse path segment information received by the node belong to intra-domain path segment information, the path is directly determined according to a preset intra-domain path computation rule. In some embodiments, a corresponding bidirectional-tunnel path segment is calculated according to the bidirectional LSP association and the intra-domain path computation rule, and the actual transmission path is determined based on the bidirectional-tunnel path segment and is bound If the association type includes the stitching LSP association, it is indicated that the node is a boundary node, a next communication node relative to the node is a boundary node in another domain, the path segment information received by the node includes intra-domain path segment information and inter-domain path segment information, the intra-domain path segment information is path segment information from the current node to a previous intra-domain node, and the inter-domain path segment information is a forwarding path from the current node to the boundary node in another domain.

In this embodiment, the nodes include three types of nodes, that is, ingress nodes, domain-boundary nodes, and egress nodes, and the different types of nodes are subjected to different forwarding processes. Therefore, the method further includes determining a type of the current node, and performing a data forwarding process according to the type of the node.

In this embodiment, in the case where the node is an ingress node, the method further includes acquiring, encapsulating and forwarding, by the ingress node, an SR list of a boundary node of a domain where the ingress node is located and a corresponding sub-path segment label.

In the case where the node is a domain-boundary node, a step of sending the to-be-transmitted data by the node to the next node based on the mapped path includes that the boundary node searches for corresponding forwarding path segment label information to a next domain and an SR list of the next domain using a path segment label of the domain where the node is located according to a binding relationship of the mapped path, performs data encapsulation according to the obtained information, and forwards the data to the next node.

In the case where the node is an egress node, a step of sending the to-be-transmitted data by the node to the next node based on the mapped path includes that the egress node searches for a corresponding reverse path segment and reverse path segment label information using a path segment label of the domain where the node is located according to a binding relationship of the mapped path, performs data encapsulation according to the obtained information, and forwards the data along a reverse path.

In practical applications, the nodes of different types are subjected to different operation processes. The ingress node encapsulates an SR list from the ingress node to a boundary node and a path SID of the domain where the ingress node is located, the SR list is configured to instruct a packet to be forwarded from the ingress node to the boundary node; the boundary node takes the path SID of the domain where the boundary node is located as a keyword, searches for path SID information of the next domain and SR list information of the next domain, or path forwarding information between boundaries using the keyword according to a stitching association binding relationship and the PCInitiate message, encapsulates the obtained information, and forwards it to a next SR node; and the egress node takes a path SID of the domain where the egress node is located as a keyword, searches for reverse path information and reverse SID information using the keyword according to a bidirectional association relationship and the PCInitiate message, encapsulates the obtained information, and forwards it along a reverse path.

With the communication method of an inter-domain bidirectional tunnel provided by this embodiment, the node receives the PCInitiate message, which includes the mapping path information for creating an inter-domain LSP and the bidirectional tunnel instruction information, from the PCE, and obtains the actual transmission path, which is used for the data transmission between the intra-domain or inter-domain nodes, based on the mapping path information and the bidirectional tunnel instruction information; by sending mapping path information used for configuring segments, the node can obtain the previous path segment and the next path segment from the mapping path information, and subject the two path segments to re-association and encapsulation, thereby creating a bidirectional tunnel; and a label stack of the created path is relatively simple, so that it is easy for the node to search and parse during data transmission, which greatly increases efficiencies of service deployment and data transmission, and also improves user experience.

Embodiment Three

Figure 4:
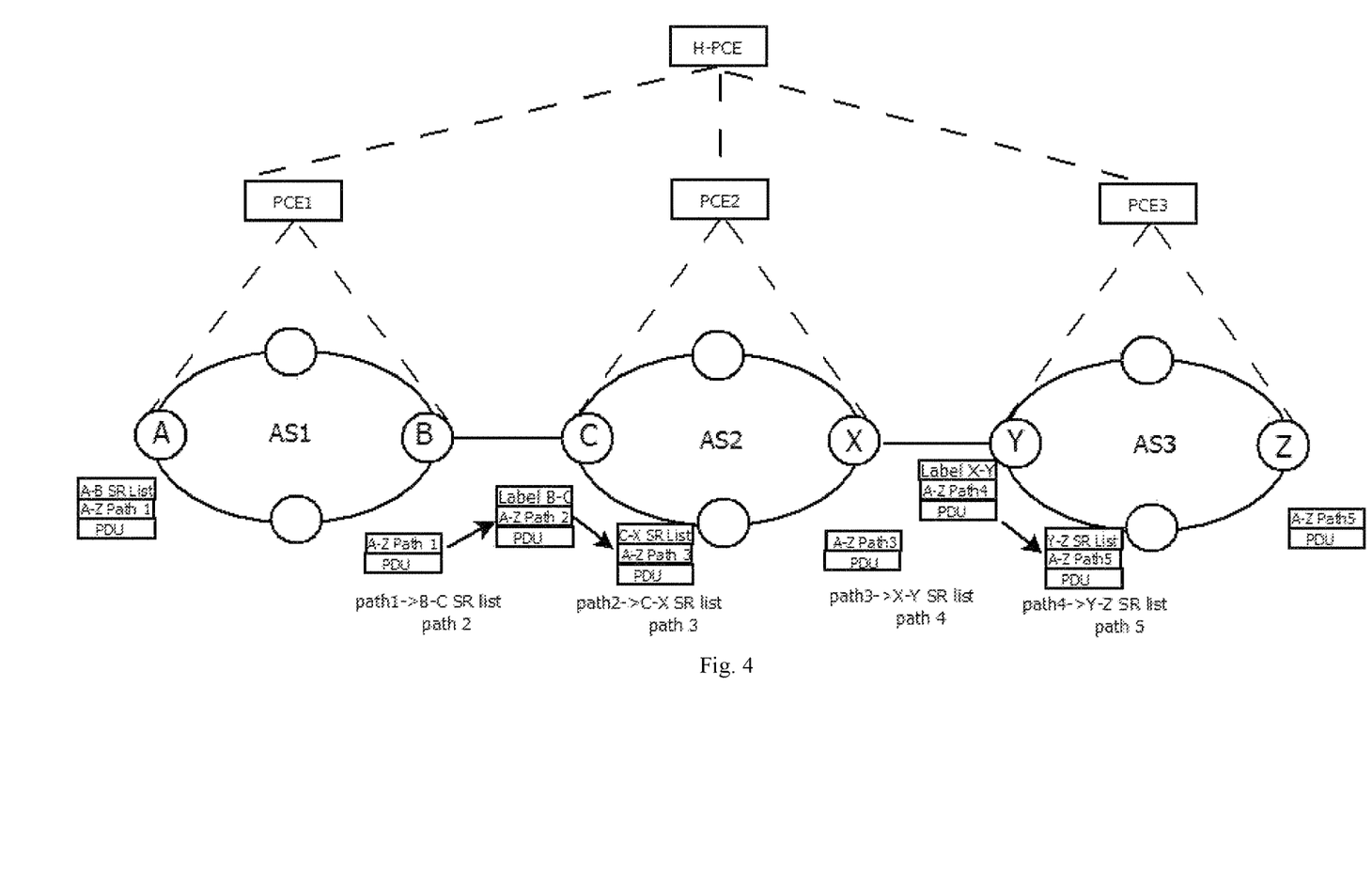
FIG. 4 shows an SR-TP inter-domain peer-to-peer model of Border link according to an embodiment of the disclosure.

The creation method of an inter-domain bidirectional tunnel and the communication method of an inter-domain bidirectional tunnel are illustrated in detail below in conjunction with application scenarios. FIG. 4 shows an inter-domain SR-TP network diagram, the nodes in which belong to a SR-TP inter-domain peer-to-peer model of border link, the network is divided into three autonomous system (AS) domains, the nodes A and B belong to the AS1 domain and are controlled by PCE1 through the PCEP, the nodes C and X belong to the AS2 domain and are controlled by PCE2 through the PCEP, and the nodes Y and Z belong to the AS3 domain and are controlled by PCE3 through the PCEP. The boundary nodes B and C of AS1 and AS2 are connected by a link, and belong to AS1 and AS2 respectively; and the boundary nodes X and Y of AS2 and AS3 are also connected by a link, and belong to AS2 and AS3 respectively. H-PCE realizes inter-domain path computation and traffic scheduling, and is connected to and exchanges information with PCE1, PCE2 and PCE3 through the hierarchical PCEP.

In FIG. 4, path1, path2, path3, path4, and path5 are segmented path segments proposed by the present disclosure, the path1, the path3, and the path5 are used as bidirectional-tunnel path identifiers within AS1, AS2, and AS3 respectively, and the path2 and the path4 are used as a bidirectional-tunnel path identifier between AS1 and AS2 and a bidirectional-tunnel path identifier between AS2 and AS3, respectively.

According to the tunnel creation method provided by the embodiments of the present disclosure, PCE1 sends a PCInitiate message carrying an LSP object and an association object to the node A, with the LSP object carrying a TLV of the segmented path segment path1, and the association object carrying a TLV of stitching LSP association in which a Type field is a stitching LSP association group (a value of which is assigned relying on the IANA of the IETF). FIG. 5 shows the format of the TLV of stitching LSP association, in which a Type field is 16 bits long, and a value indicating that this TLV is a TLV of stitching LSP association is assigned relying on the IANA of the IETF; a value of a Length field is 4, which indicates that this TLV is 4 bytes; and a Reserved field is a field reserved for later extensions.

According to the tunnel creation method provided by the embodiments of the present disclosure, PCE1 sends a PCInitiate message which carries the path1, an LSP tunnel path LSP1 from A to B, and a TLV of stitching LSP association to the node B, meanwhile HPCE sends the path2 and a stitching LSP association id ID1 to PCE1, and PCE1 sends the path2, a label from B to C Label B-C, and the ID1, which are sent by HPCE, to the node B. Since the stitching LSP association ids sent to the node B twice are the same, the node B performs a splicing process on the label and the path information, which are sent to the node B twice, maps onto the path2 and the Label B-C using the path1 as an incoming label, that is, the node B removes the path1 away and encapsulates the Label B-C and the path2 when the node B receives a segment having a value equal to the path1, the Label B-C is configured to instruct data to be forwarded from the node B to the node C, and the path2 is configured to indicate a bidirectional-tunnel path between the node B and the node C.

Embodiments Four

Specific processes and methods of the present disclosure are described in conjunction with the SR-TP peer-to-peer model of border link.

With reference to FIG. 4, supposing that a PCE initiates the creation of an LSP in this embodiment, a process of information interaction between HPCE and PCE1, PCE2, and PCE3 includes the following steps (1) to (8) according to the present disclosure.

At the step (1), H-PCE sends a PCInitiate message to PCE1, the message carrying path2 which is forward path segment information, stitching LSP association id1, and a path label from B to C Label B-C.

At the step (2), H-PCE sends a PCInitiate message to PCE1, the message carrying path2' which is reverse path segment information, and stitching LSP association id1'.

At the step (3), H-PCE sends a PCInitiate message to PCE2, the message carrying the path2, and the stitching LSP association id1.

At the step (4), H-PCE sends a PCInitiate message to PCE2, the message carrying the path2', the stitching LSP association id1', and a path label from C to B Label C-B.

At the step (5), H-PCE sends a PCInitiate message to PCE2, the message carrying path4, the stitching LSP association id1, and a path label from X to Y Label X-Y.

At the step (6), H-PCE sends a PCInitiate message to PCE2, the message carrying the path4, and the stitching LSP association id1'.

At the step (7), H-PCE sends a PCInitiate message to PCE3, the message carrying the path4 and the stitching LSP association id1.

At the step (8), H-PCE sends a PCInitiate message to PCE3, the message carrying the path4', the stitching LSP association id1', and a path label from Y to X Label Y-X.

In this embodiment, after receiving the PCInitiate messages sent by H-PCE, each PCE needs to forward the PCInitiate messages to a corresponding node within a domain where the PCE is located, and the node performs mapping adaptation and encapsulation for an inter-domain path or an intra-domain path according to the corresponding PCInitiate messages. In FIG. 4, a process of information interaction between PCE1, PCE2, and PCE3 and the SR nodes A, B, C, X, Y, and Z includes the following steps (1) to (16).

At the step (1), PCE1 sends a PCInitiate message to the node A, the message carrying path1, an A-B (i.e., from A to B) LSP ID, an A-B LSP SR list, and a bidirectional LSP association id1.

At the step (2), PCE1 sends a PCInitiate message to the node A, the message carrying path1', a B-A LSP ID, and a bidirectional LSP association id1'.

At the step (3), PCE1 sends a PCInitiate message to the node B, the message carrying the path1, the A-B LSP ID, and the stitching LSP association id1.

At the step (4), PCE1 sends a PCInitiate message to the node B, the message carrying the path1', the B-A LSP ID, a B-A LSP SR list, and the stitching LSP association id1'.

At the step (5), PCE1 sends a PCInitiate message to the node B, the message carrying the path2, the Label B-C, and the stitching LSP association id1.

At the step (6), PCE2 sends a PCInitiate message to the node C, the message carrying the path2', the Label C-B, and the stitching LSP association id1'.

At the step (7), PCE2 sends a PCInitiate message to the node C, the message carrying path3, a C-X LSP ID, a C-X LSP SR list, and the stitching LSP association id1.

At the step (8), PCE2 sends a PCInitiate message to the node C, the message carrying path3', an X-C LSP ID, and the stitching LSP association id1'.

At the step (9), PCE2 sends a PCInitiate message to the node X, the message carrying the path3, the C-X LSP ID, and the stitching LSP association id1.

At the step (10), PCE2 sends a PCInitiate message to the node X, the message carrying the path3', the X-C LSP ID, an X-C LSP SR list, and the stitching LSP association id1'.

At the step (11), PCE2 sends a PCInitiate message to the node X, the message carrying the path4, the Label X-Y, and the stitching LSP association id1.

At the step (12), PCE3 sends a PCInitiate message to the node Y, the message carrying the path4', the Label Y-X, and the stitching LSP association id1'.

At the step (13), PCE3 sends a PCInitiate message to the node Y, the message carrying path5, a Y-Z LSP ID, a Y-Z LSP SR list, and the stitching LSP association id1.

At the step (14), PCE3 sends a PCInitiate message to the node Y, the message carrying path5', a Z-Y LSP ID, and the stitching LSP association id1'.

At the step (15), PCE3 sends a PCInitiate message to the node Z, the message carrying the path5, the Y-Z LSP ID, and the bidirectional LSP association id1'.

At the step (16), PCE3 sends a PCInitiate message to the node Z, the message carrying the path5', the Z-Y LSP ID, a Z-Y LSP SR list, and the bidirectional LSP association id1'.

Each of the nodes B, C, X, and Y performs a path splicing process according to the same stitching LSP association ids, maps the path SID of the domain where the node is located onto the path SID and the SR list path (or inter-domain label) of a next domain or onto the inter-domain path SID and the inter-domain SR list path (or inter-domain label).

The head node A and the tail node Z perform bidirectional-tunnel path binding according to the same bidirectional LSP association ids.

According to the above information about a forwarding table, a data forwarding process of the inter-domain SR-TP of border link of the present disclosure includes the following steps (101) to (106).

At the step (101), the head node A encapsulates the A-B SR list (i.e., the SR list from A to B) and the path1 into a packet, and forwards the packet to the node B according to the SR list.

At the step (102), after receiving the packet sent by the node A, the node B searches mapping information in the forwarding table according to the path1 to obtain the path2 and the Label B-C, encapsulates the Label B-C and the path2 into the packet, and forwards the packet to the node C according to the Label B-C.

At the step (103), after receiving the packet sent by the node B, the node C searches the mapping information in the forwarding table according to the path2 to obtain the path3 and the C-X SR list, encapsulates the C-X SR list and the path3 into the packet, and forwards the packet to the node X according to the SR list.

At the step (104), after receiving the packet sent by the node C, the node X searches the mapping information in the forwarding table according to the path3 to obtain the path4 and the Label X-Y, encapsulates the Label X-Y and the path4 into the packet, and forwards the packet to the node Y according to the Label X-Y.

At the step (105), after receiving the packet sent by the node X, the node Y searches the mapping information in the forwarding table according to the path4 to obtain the path5 and the Y-Z SR list, encapsulates the Y-Z SR list and the path5 into the packet, and forwards the packet to the node Z according to the SR list.

At the step (106), after receiving the packet, the node Z performs loopback operation according to the path 5.

A process of forwarding a packet along a reverse path is similar to the above process, and thus will not be described in detail. In this way, packet forwarding along the SR-TP bidirectional tunnel is completed.

Embodiment Five

Another type of node exists in the embodiments of the present disclosure, that is, a node that simultaneously belongs to two different domains. The specific processes of the tunnel creation method of the present disclosure in the case of this type of node is described in this embodiment in conjunction with an SR-TP peer-to-peer model of border node.

Figure 6:
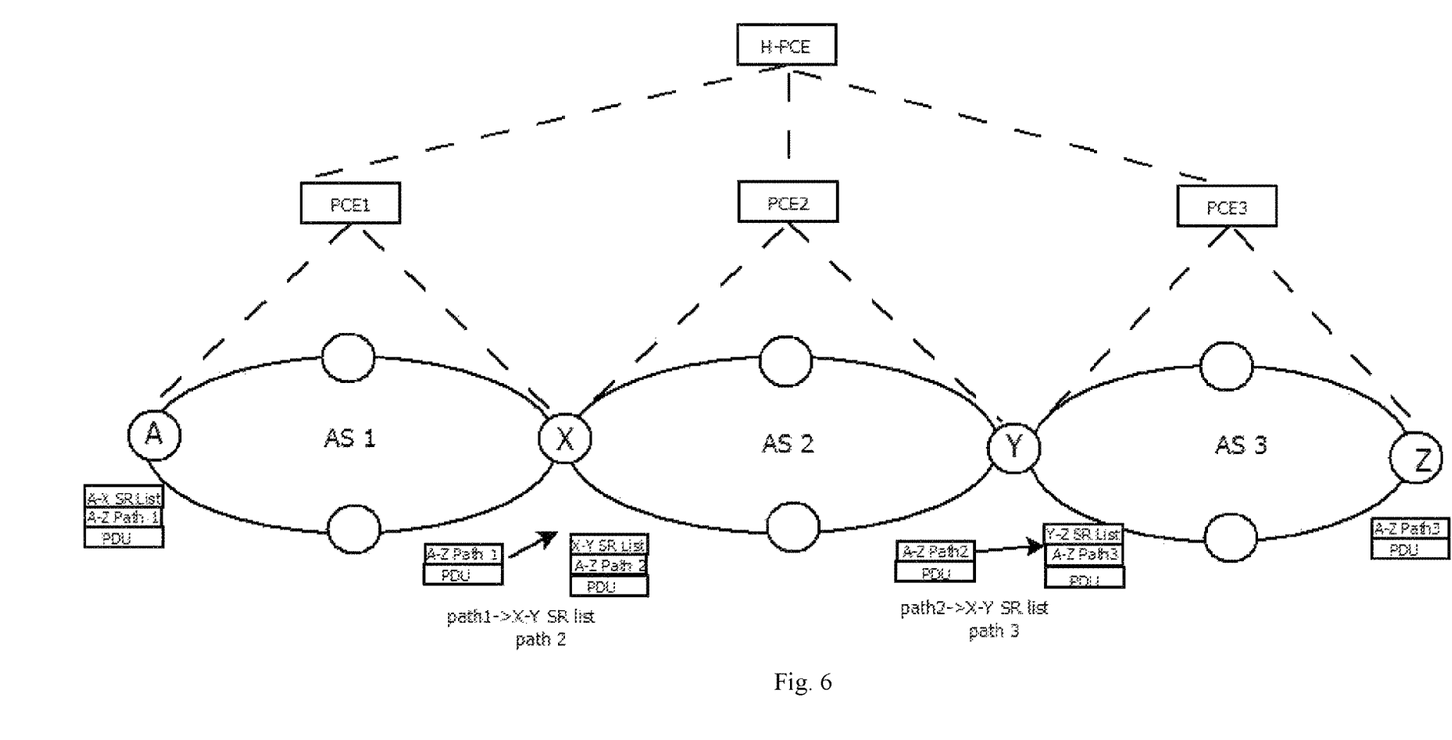
FIG. 6 shows an SR-TP inter-domain peer-to-peer model of Border node according to an embodiment of the present disclosure.

As shown in FIG. 6, a network is divided into three AS domains, the nodes A and X belong to the AS1 domain and are controlled by PCE1 through the PCEP, the nodes X and Y belong to the AS2 domain and are controlled by PCE2 through the PCEP, and the nodes Y and Z belong to the AS3 domain and are controlled by PCE3 through the PCEP. The node X is located on a boundary of the AS1 domain and the AS2 domain, and the node Y is located on a boundary of the AS2 domain and the AS3 domain. H-PCE realizes inter-domain path computation and traffic scheduling, and is connected to and exchanges information with PCE1, PCE2 and PCE3 through the hierarchical PCEP.

In FIG. 6, path1, path2, and path3 are segmented path segments proposed by the present disclosure, and are used as bidirectional-tunnel path identifiers of the AS1 domain, the AS2 domain and the AS3 domain, respectively. Supposing that a PCE initiates the creation of an LSP in this embodiment, a process of information interaction between PCE1, PCE2, and PCE3 and the SR nodes A, X, Y, and Z includes the following steps (1) to (12).

At the step (1), PCE1 sends a PCInitiate message to the node A, the message carrying path1, an A-X LSP ID, an A-X LSP SR list, and a bidirectional LSP association id1.

At the step (2), PCE1 sends a PCInitiate message to the node A, the message carrying path1', an X-A LSP ID, and a bidirectional LSP association id1'.

At the step (3), PCE1 sends a PCInitiate message to the node X, the message carrying the path1, the A-X LSP ID, and a stitching LSP association id1.

At the step (4), PCE1 sends a PCInitiate message to the node X, the message carrying the path1', the X-A LSP ID, an X-A LSP SR list, and a stitching LSP association id1'.

At the step (5), PCE2 sends a PCInitiate message to the node X, the message carrying path2, an X-Y LSP ID, an X-Y LSP SR list, and the stitching LSP association id1.

At the step (6), PCE2 sends a PCInitiate message to node X, the message carrying path2', a Y-X LSP ID, and the stitching LSP association id1'.

At the step (7), PCE2 sends a PCInitiate message to the node Y the message carrying the path2, the X-Y LSP ID, the X-Y LSP SR list, and the stitching LSP association id1.

At the step (8), PCE2 sends a PCInitiate message to the node Y, the message carrying the path2', the Y-X LSP ID, a Y-X LSP SR list, and the stitching LSP association id1'.

At the step (9), PCE3 sends a PCInitiate message to the node Y, the message carrying path3, a Y-Z LSP ID, a Y-Z LSP SR list, and the stitching LSP association id1.

At the step (10), PCE3 sends a PCInitiate message to the node Y, the message carrying path3', a Z-Y LSP ID, and the stitching LSP association id1'.

At the step (11), PCE3 sends a PCInitiate message to the node Z, the message carrying the path3, the Y-Z LSP ID, and the bidirectional LSP association id1.

At the step (12), PCE3 sends a PCInitiate message to the node Z, the message carrying the path3', the Z-Y LSP ID, a Z-Y LSP SR list, and the bidirectional LSP association id1'.

For the border nodes X and Y, the processing of the received information is as follows (taking the node X as an example for illustration): the path1 is bound with LSP1, the path2 is bound with the LSP2, a splicing process is performed according to the same received stitching LSP association ids, the path1 is associated with the path2, the node X searches, when receiving the path1, for the path2 associated with the path1 according to the path1, searches for the LSP2 according to the path2, and then performs inter-domain label encapsulation and mapping.

The head node A and the tail node Z perform bidirectional-tunnel path binding according to the same bidirectional LSP association ids.

According to the above information about a forwarding table, a data forwarding process of the inter-domain SR-TP of border link of the present disclosure includes the following steps (101) to (104).

At the step (101), the head node A encapsulates the A-X SR list and the path1 into a packet, and forwards the packet to the node X according to the SR list.

At the step (102), after receiving the packet sent by the node A, the node X searches mapping information in the forwarding table according to the path1 to obtain the path2 and the X-Y SR list, encapsulates the X-Y SR list and the path2 into the packet, and forwards the packet to the node Y according to the X-Y SR list.

At the step (103), after receiving the packet sent by the node X, the node Y searches the mapping information in the forwarding table according to the path2 to obtain the path3 and the Y-Z SR list, encapsulates the Y-Z SR list and the path3 into the packet, and forwards the packet to the node Z according to the SR list.

At the step (104), after receiving the packet, the node Z performs loopback operation according to the path3.

A process of forwarding a packet along a reverse path is similar to the above process, and thus will not be described in detail. In this way, packet forwarding along the SR-TP bidirectional tunnel of Border node is completed.

Embodiment Six

Figure 7:
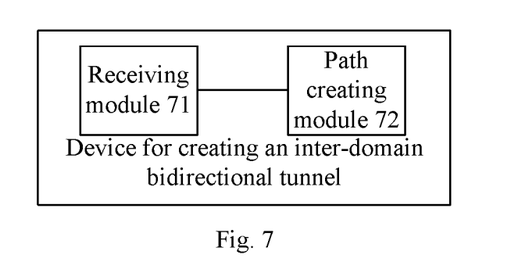
FIG. 7 is a schematic structural diagram of a device for creating an inter-domain bidirectional tunnel according to an embodiment of the present disclosure.

FIG. 7 shows a device for creating an inter-domain bidirectional tunnel according to an embodiment of the present disclosure. The device includes a receiving module 71 configured to receive a path creation message which is sent by a PCE or a hierarchical path element and includes mapping path information for creating an inter-domain LSP, and bidirectional tunnel instruction information; and a path creating module 72 configured to obtain an actual transmission path, which is used for the data transmission between the intra-domain or inter-domain nodes, based on the mapping path information and the bidirectional tunnel instruction information.

In this embodiment, the mapping path information for the inter-domain LSP includes path segment information, and the bidirectional tunnel instruction information includes an association type of the path segment information, and the association type is configured to identify whether the path segment information is inter-domain bidirectional path segment information or intra-domain bidirectional path information.

The path segment information includes intra-domain path segment information, or intra-domain path segment information and inter-domain path segment information.

The association type includes bidirectional LSP association used for bidirectional-tunnel path binding on a head node and a tail node, and stitching LSP association used for LSP splicing between inter-domain boundary nodes.

If the association type includes the bidirectional LSP association, which indicates that the forward path segment information and the reverse path segment information received by a node belong to intra-domain path segment information, the path is directly determined according to a preset intra-domain path computation rule. In some embodiments, the path creating module 72 calculates a corresponding bidirectional-tunnel path segment according to the bidirectional LSP association and the intra-domain path computation rule, and determines and binds the actual transmission path based on the bidirectional-tunnel path segment.

If the association type includes the stitching LSP association, it is indicated that the node is a boundary node, a next communication node relative to the node is a boundary node in another domain, the path segment information received by the node includes intra-domain path segment information and inter-domain path segment information, the intra-domain path segment information is path segment information from the current node to a previous intra-domain node, and the inter-domain path segment information is a forwarding path from the current node to the boundary node in another domain.

The path creating module 72 splices the intra-domain path segment information and the forwarding path according to the stitching LSP association to generate an inter-domain bidirectional mapped path and an inter-domain bidirectional-tunnel path segment.

In this embodiment, the stitching LSP association is stored as data in a TLV format in the path creation message and sent along with the path creation message, and the TLV format includes a Type field, a Length field, and a Reserved field.

In this embodiment, the path creation message is sent mainly in the form of an inter-domain path creation PCInitiate message. The description below is given by taking sending PCInitiate messages as an example. In addition to the PCInitiate message, the path creation message can be other messages, as long as those messages are supported by node communication or links.

In practical applications, the PCE includes a parent PCE and a child PCE, the parent PCE (H-PCE) is configured to perform inter-domain path computation and traffic scheduling, the child PCE is configured to receive inter-domain path segment information sent by the H-PCE, perform path computation and traffic scheduling within a domain where the child PCE is located, and then send the inter-domain path segment information and intra-domain path segment information to a corresponding node. In practical applications, the H-PCE is connected to and exchanges information with PCE1, PCE2, and PCE3 via the hierarchical PCEP. In some embodiments, the child PCE acquires a first PCInitiate message carrying inter-domain path segment information from the parent PCE through the PCEP; and the child PCE calculates path segment information between the nodes within the domain where the child PCE is located according to an intra-domain node path computation rule, generates a second PCInitiate message, and sends the second PCInitiate message to a corresponding node; or the child PCE encapsulates the calculated path segment information between the nodes within the domain in the first PCInitiate message, and then sends the first PCInitiate message to the corresponding node.

According to the device for creating an inter-domain bidirectional tunnel provided by this embodiment, the device receives the PCInitiate message, which includes the mapping path information for creating an inter-domain LSP and the bidirectional tunnel instruction information, from the PCE, and obtains the actual transmission path, which is used for the data transmission between the intra-domain or inter-domain nodes, based on the mapping path information and the bidirectional tunnel instruction information; by sending mapping path information used for configuring segments, the node can obtain the previous path segment and the next path segment from the mapping path information, and subject the two path segments to re-association and encapsulation, thereby creating a bidirectional tunnel; and a label stack of the created path is relatively simple, so that it is easy for the node to search and parse during data transmission, which greatly increases efficiencies of service deployment and data transmission, and also improves user experience.

Embodiment Seven

Figure 8:
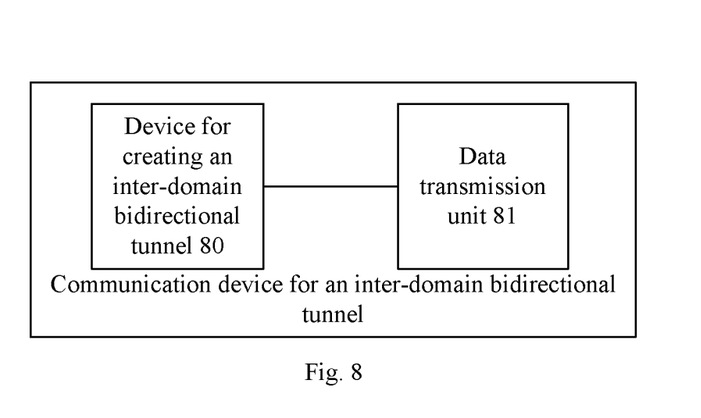
FIG. 8 is a schematic structural diagram of a communication device for an inter-domain bidirectional tunnel according to an embodiment of the present disclosure.

FIG. 8 is a schematic structural diagram of a communication device for an inter-domain bidirectional tunnel according to an embodiment of the present disclosure. The device includes the device for creating an inter-domain bidirectional tunnel 80 provided in the above embodiment, and a data transmission unit 81. The device for creating an inter-domain bidirectional tunnel 80 is configured to receive a path creation message sent by a PCE or a hierarchical path element, where the path creation message includes the mapping path information for creating an inter-domain LSP and the bidirectional tunnel instruction information, and obtain an actual transmission path based on the mapping path information and the bidirectional tunnel instruction information; and the data transmission unit 81 is configured to transmit to-be-transmitted data from a current node to a next node based on the actual transmission path.

In this embodiment, the device further includes a determination unit configured to determine a type of the current node, and the type includes an ingress node, a domain-boundary node, and an egress node.

In practical applications, different data forwarding processes are performed according to different node types. In the case where the node is an ingress node, the method further includes acquiring, encapsulating and forwarding, by the ingress node, an SR list of a boundary node of a domain where the ingress node is located and a corresponding sub-path segment label; that is, the ingress node encapsulates an SR list from the ingress node to a boundary node and a path SID of the domain where the ingress node is located, and the SR list is configured to instruct a packet to be forwarded from the ingress node to the boundary node. In the case where the node is a domain-boundary node, a step of sending the to-be-transmitted data by the node to the next node based on the mapped path includes that the boundary node searches for corresponding forwarding path segment label information to a next domain and an SR list of the next domain using a path segment label of the domain where the node is located according to a binding relationship of the mapped path, performs data encapsulation according to the obtained information, and forwards the data to the next node.

In this embodiment, the path creation message is sent mainly in the form of an inter-domain path creation PCInitiate message. The description below is given by taking sending PCInitiate messages as an example. In addition to the PCInitiate message, the path creation message can be other messages, as long as those messages are supported by node communication or links.

In some embodiments, the boundary node takes the path SID of the domain where the boundary node is located as a keyword, searches for path SID information of the next domain and SR list information of the next domain, or path forwarding information between boundaries using the keyword according to a stitching association binding relationship and the PCInitiate message, encapsulates the obtained information, and forwards it to a next SR node.

In the case where the node is an egress node, a step of sending the to-be-transmitted data by the node to the next node based on the mapped path includes that the egress node searches for a corresponding reverse path segment and reverse path segment label information using a path segment label of the domain where the node is located according to a binding relationship of the mapped path, performs data encapsulation according to the obtained information, and forwards the data along a reverse path.

In some embodiments, the egress node takes a path SID of the domain where the egress node is located as a keyword, searches for reverse path information and reverse SID information using the keyword according to a bidirectional association relationship and the PCInitiate message, encapsulates the obtained information, and forwards it along a reverse path.

According to the communication device for an inter-domain bidirectional tunnel, the device receives the PCInitiate message, which includes the mapping path information for creating an inter-domain LSP and the bidirectional tunnel instruction information, from the PCE, and obtains the actual transmission path, which is used for the data transmission between the intra-domain or inter-domain nodes, based on the mapping path information and the bidirectional tunnel instruction information; by sending mapping path information used for configuring segments, the node can obtain the previous path segment and the next path segment from the mapping path information, and subject the two path segments to re-association and encapsulation, thereby creating a bidirectional tunnel; and a label stack of the created path is relatively simple, so that it is easy for the node to search and parse during data transmission, which greatly increases efficiencies of service deployment and data transmission, and also improves user experience.

Embodiment Eight

Figure 9:
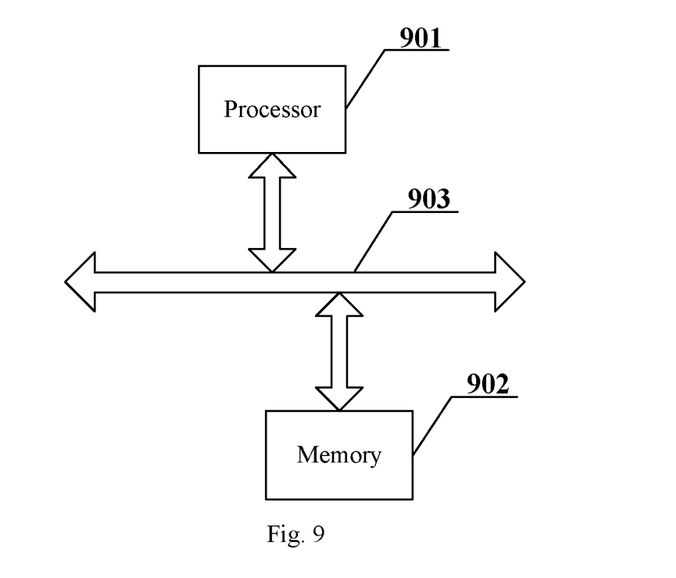
FIG. 9 is a schematic structural diagram of a communication device according to an embodiment of the disclosure.

A communication device is provided in this embodiment. With reference to FIG. 9, the system includes a processor 901, a memory 902, and a communication bus 903; the communication bus 903 is configured to implement communication connection between the processor 901 and the memory 902; the processor 901 is configured to execute one or more first programs stored in the memory 902 to perform the steps that a domain-boundary node receives a path creation message which is sent by a PCE or a hierarchical path element and includes mapping path information for creating an inter-domain LSP, and bidirectional tunnel instruction information, and obtains an actual transmission path, which is used for data transmission between intra-domain or inter-domain nodes, based on the mapping path information and the bidirectional tunnel instruction information.

The processor 901 is further configured to execute one or more second programs stored in the memory 902 to perform the following steps: receiving a path creation message which is sent by a PCE or a hierarchical path element and includes mapping path information for creating an inter-domain LSP, and bidirectional tunnel instruction information; obtaining an actual transmission path based on the mapping path information and the bidirectional tunnel instruction information; and sending to-be-transmitted data by a node to a next node based on the actual transmission path.

In this embodiment, the mapping path information for the inter-domain LSP includes path segment information, and the bidirectional tunnel instruction information includes an association type of the path segment information, and the association type is configured to identify whether the path segment information is inter-domain bidirectional path segment information or intra-domain bidirectional path information.

The path segment information includes intra-domain path segment information, or intra-domain path segment information and inter-domain path segment information.

The association type includes bidirectional LSP association used for bidirectional-tunnel path binding on a head node and a tail node, and stitching LSP association used for LSP splicing between inter-domain boundary nodes.

In this embodiment, the path creation message is sent mainly in the form of an inter-domain path creation PCInitiate message. The description below is given by taking sending PCInitiate messages as an example. In addition to the PCInitiate message, the path creation message can be other messages, as long as those messages are supported by node communication or links.

The node acquires different pieces of path segment information by receiving one or more PCInitiate messages. A total number of the PCInitiate messages received is specified according to a processing rule of the PCE.

For the path segment information received by the node, at least one of the following conditions are met: the path segment information includes intra-domain forward path segment information and intra-domain reverse path segment information, the path segment information includes inter-domain forward path segment information and intra-domain reverse path segment information, and the path segment information includes intra-domain forward path segment information and inter-domain reverse path segment information.

In this embodiment, the method further includes determining a type of the current node, and performing a data forwarding process according to the type of the node.

In the case where the node is an ingress node, the method further includes acquiring, encapsulating and forwarding, by the ingress node, an SR list of a boundary node of a domain where the ingress node is located and a corresponding sub-path segment label.

In the case where the node is a domain-boundary node, a step of sending the to-be-transmitted data by the node to the next node based on the mapped path includes that the boundary node searches for corresponding forwarding path segment label information to a next domain and an SR list of the next domain using a path segment label of the domain where the node is located according to a binding relationship of the mapped path, performs data encapsulation according to the obtained information, and forwards the data to the next node.

In the case where the node is an egress node, a step of sending the to-be-transmitted data by the node to the next node based on the mapped path includes that the egress node searches for a corresponding reverse path segment and reverse path segment label information using a path segment label of the domain where the node is located according to a binding relationship of the mapped path, performs data encapsulation according to the obtained information, and forwards the data along a reverse path.

Correspondingly, the embodiment of the present disclosure further provides a computer-readable storage medium, including volatile/nonvolatile and removable/non-removable media used in any method or technology for storing information (such as computer-readable instructions, data structures, program modules or other data). The computer-readable storage medium includes, but is not limited to, a Random Access Memory (RAM), a Read-Only Memory (ROM), an Electrically Erasable Programmable Read-Only Memories (EEPROM), a flash memory or other memories, a Compact Disc Read-Only Memories (CD-ROM), a Digital Video Disk (DVD) or another optical disc, a magnetic cassette, a magnetic tape, a magnetic disk or other magnetic storage devices, or any other medium which can be used to store the desired information and can be accessed by a computer.

The computer-readable storage medium in this embodiment can be configured to store the one or more first computer programs and second computer programs, and the stored one or more first computer programs and second computer programs can be executed by the processor to implement at least one step of the method for creating an inter-domain bidirectional tunnel in the Embodiment One and the communication method for an inter-domain bidirectional tunnel in the Embodiment Two.

This embodiment further provides a computer program, which can be distributed on a computer readable medium and executed by a computing device to implement at least one step of the method in the Embodiment One. In some cases, at least one step illustrated or described herein may be executed in an order different from that described in the embodiments.

This embodiment further provides a computer program product, including a computer readable device having the above computer program stored therein. In this embodiment, the computer readable device may include the above computer-readable storage medium.

To sum up, with the method and the device for creating an inter-domain bidirectional tunnel, the communication method and the communication device for an inter-domain bidirectional tunnel, and the computer-readable storage medium provided by the embodiments of the present disclosure, the node receives the PCInitiate message, which includes the mapping path information for creating an inter-domain LSP and the bidirectional tunnel instruction information, from the PCE, and obtains the actual transmission path, which is used for the data transmission between the intra-domain or inter-domain nodes, based on the mapping path information and the bidirectional tunnel instruction information; by sending mapping path information used for configuring segments, the node can obtain the previous path segment and the next path segment from the mapping path information, and subject the two path segments to re-association and encapsulation, thereby creating a bidirectional tunnel; and a label stack of the created path is relatively simple, so that it is easy for the node to search and parse during data transmission, which greatly increases efficiencies of service deployment and data transmission, and also improves user experience.

It should be understood by those of ordinary skill in the art that the functional modules/units in all or some of the steps, the systems, and the devices in the methods disclosed above may be implemented as software (which may be implemented as computer program codes executable by a computing device), firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor or a microprocessor, or may be implemented as hardware, such as an application specific integrated circuit.

In addition, it is well known by those of ordinary skill in the art that the communication media generally include computer-readable instructions, data structures, program modules or other data in a modulated data signal, such as a carrier wave or other transmission mechanism, and may include any information delivery media. Therefore, the present disclosure is not limited to any specific combination of hardware and software.

The above is a further detailed description of the embodiments of the present disclosure in conjunction with the specific implementations, but the specific implementations of the present disclosure are not limited to the above description. Several simple deductions or substitutions can be made by those of ordinary skill in the art without departing from the concept of the present disclosure, and should be considered to fall within the scope of the present disclosure.

What is claimed is:

1. A method for creating an inter-domain bidirectional tunnel, comprising:
   receiving, by a domain-boundary node, an inter-domain path creation PCInitiate message sent by a path computation element (PCE) or a hierarchical path element, the PCInitiate message comprising mapping path information for creating an inter-domain label switched path (LSP) and bidirectional tunnel instruction information; and
   obtaining an actual transmission path, which is used for data transmission between intra-domain or inter-domain nodes, based on the mapping path information and the bidirectional tunnel instruction information.

2. The method for creating an inter-domain bidirectional tunnel of claim 1, further comprising determining a type of the domain-boundary node, wherein the type comprises an ingress boundary node, an inter-domain boundary node, and an egress boundary node.

3. The method for creating an inter-domain bidirectional tunnel of claim 2, wherein the mapping path information for the inter-domain LSP comprises path segment information, and the bidirectional tunnel instruction information comprises an association type of the path segment information.

4. The method for creating an inter-domain bidirectional tunnel of claim 3, wherein the path segment information is acquired by receiving one or more PCInitiate messages through Path Computation Element Communication Protocol (PCEP).

5. The method for creating an inter-domain bidirectional tunnel of claim 4, wherein the path segment information comprises intra-domain path segment information and inter-domain path segment information.

6. The method for creating an inter-domain bidirectional tunnel of claim 5, wherein, in a case where the domain-boundary node is an ingress boundary node or an egress boundary node, the association type is bidirectional LSP association;
   the step of obtaining the actual transmission path based on the mapping path information and the bidirectional tunnel instruction information comprises:
   calculating a corresponding bidirectional-tunnel path segment according to the bidirectional LSP association and an intra-domain path computation rule; and
   determining the actual transmission path based on the bidirectional-tunnel path segment, and binding the path.

7. The method for creating an inter-domain bidirectional tunnel of claim 5, wherein, in a case where the domain-boundary node is an inter-domain boundary node, the association type is stitching LSP association;
   the intra-domain path segment information is path segment information from the domain-boundary node to a previous intra-domain node, and the inter-domain path segment information is a forwarding path from the domain-boundary node to a domain-boundary node in another domain;
   the step of obtaining the actual transmission path based on the mapping path information and the bidirectional tunnel instruction information comprises:
   splicing the intra-domain path segment information and the forwarding path according to the stitching LSP association to generate an inter-domain bidirectional mapped path and an inter-domain bidirectional-tunnel path segment.

8. The method for creating an inter-domain bidirectional tunnel of claim 7, wherein the stitching LSP association is stored as data in a TLV format in the PCInitiate message and sent along with the PCInitiate message, and the TLV format comprises a Type field, a Length field, and a Reserved field.

9. The method for creating an inter-domain bidirectional tunnel of claim 1, wherein the PCE comprises a parent PCE and a child PCE, and the step of receiving, by the domain-boundary node, the inter-domain path creation PCInitiate message sent by the PCE or the hierarchical path element comprises that:
   the child PCE acquires a first PCInitiate message carrying inter-domain path segment information from the parent PCE through the PCEP; and
   the child PCE calculates path segment information between nodes within a domain where the child PCE is located according to an intra-domain node path computation rule, generates a second PCInitiate message, and sends the second PCInitiate message to a corresponding node; or the child PCE encapsulates the calculated path segment information between the nodes within the domain in the first PCInitiate message, and then sends the first PCInitiate message to a corresponding node.

10. A communication method for an inter-domain bidirectional tunnel, comprising:
- receiving, by a node, an inter-domain path creation PCInitiate message sent by a PCE or a hierarchical path element, the PCInitiate message comprising mapping path information for creating an inter-domain LSP and bidirectional tunnel instruction information;
- obtaining an actual transmission path based on the mapping path information and the bidirectional tunnel instruction information; and
- sending to-be-transmitted data by the node to a next node based on the actual transmission path.

11. The communication method for an inter-domain bidirectional tunnel of claim 10, further comprising determining a type of the node, wherein the type comprises an ingress node, a domain-boundary node, and an egress node.

12. The communication method for an inter-domain bidirectional tunnel of claim 11, in a case where the node is an ingress node, further comprising:
- acquiring, encapsulating and forwarding, by the ingress node, a Segment Routing (SR) list of a domain-boundary node of a domain where the ingress node is located and a corresponding sub-path segment label.

13. The communication method for an inter-domain bidirectional tunnel of claim 11, wherein, in a case where the node is a domain-boundary node, the step of sending the to-be-transmitted data by the node to the next node based on the actual transmission path comprises that:
- the boundary node searches for corresponding forwarding path segment label information to a next domain and an SR list of the next domain using a path segment label of a domain where the node is located according to a binding relationship of the actual transmission path; and
- performs encapsulation of data according to obtained information, and forwards the data to the next node.

14. The communication method for an inter-domain bidirectional tunnel of claim 11, wherein, in the case where the node is an egress node, the step of sending the to-be-transmitted data by the node to the next node based on the actual transmission path comprises that:
- the egress node searches for a corresponding reverse path segment and reverse path segment label information using a path segment label of a domain where the node is located according to a binding relationship of the actual transmission path; and
- performs encapsulation of data according to obtained information, and forwards the data along a reverse path.

15. A device for creating an inter-domain bidirectional tunnel, comprising:
- a receiving module configured to receive an inter-domain path creation PCInitiate message sent by a PCE or a hierarchical path element, the PCInitiate message comprising mapping path information for creating an inter-domain LSP and bidirectional tunnel instruction information; and
- a path creating module configured to obtain an actual transmission path, which is used for data transmission between intra-domain or inter-domain nodes, based on the mapping path information and the bidirectional tunnel instruction information.

16. A communication device for an inter-domain bidirectional tunnel, comprising the device for creating an inter-domain bidirectional tunnel of claim 15, and a data transmission unit;
- the device for creating an inter-domain bidirectional tunnel is configured to receive an inter-domain path creation PCInitiate message sent by a PCE or a hierarchical path element, the PCInitiate message comprising mapping path information for creating an inter-domain LSP and bidirectional tunnel instruction information, and obtain an actual transmission path based on the mapping path information and the bidirectional tunnel instruction information; and
- the data transmission unit is configured to transmit to-be-transmitted data from a current node to a next node based on the actual transmission path.

17. A communication device, comprising a processor, a memory, and a communication bus;
- the communication bus is configured to implement communication connection between the processor and the memory;
- the processor is configured to execute one or more programs stored in the memory to perform steps of the method for creating an inter-domain bidirectional tunnel of claim 1.

18. A non-transitory computer-readable storage medium storing having one or more computer programs stored therein; the one or more computer programs are executable by one or more processors to implement steps of the method for creating an inter-domain bidirectional tunnel of claim 1.

19. A communication device, comprising a processor, a memory, and a communication bus;
- the communication bus is configured to implement communication connection between the processor and the memory;
- the processor is configured to execute one or more programs stored in the memory to perform steps of the communication method for an inter-domain bidirectional tunnel of claim 10.

20. A non-transitory computer-readable storage medium storing having one or more computer programs stored therein; the one or more computer programs are executable by one or more processors to implement steps of the communication method for an inter-domain bidirectional tunnel of claim 10.

* * * * *